(12) United States Patent
Ifflaender

(10) Patent No.: US 6,402,178 B1
(45) Date of Patent: *Jun. 11, 2002

(54) MOTOR VEHICLE TRAILER COUPLING

(75) Inventor: Wolfgang Ifflaender, Bremen (DE)

(73) Assignee: Jaeger Cartronix GmbH, Bad Homburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,789

(22) PCT Filed: Sep. 3, 1996

(86) PCT No.: PCT/EP96/03850

§ 371 (c)(1),
(2), (4) Date: Mar. 9, 1998

(87) PCT Pub. No.: WO97/10111

PCT Pub. Date: Mar. 20, 1997

(30) Foreign Application Priority Data

Sep. 13, 1995 (DE) .......................... 195 33 670
Dec. 7, 1995 (DE) .......................... 195 45 620
Feb. 15, 1996 (DE) .......................... 196 05 570

(51) Int. Cl.[7] .................................. B60D 1/01
(52) U.S. Cl. .................. 280/491.3; 280/491.2; 280/479.1

(58) Field of Search .......................... 280/491.1, 491.2, 280/491.3, 491.4, 479.1, 478.1, 477

(56) References Cited

U.S. PATENT DOCUMENTS

| | | | |
|---|---|---|---|
| 3,473,826 A | | 10/1969 | Elliott et al. |
| 3,649,048 A | * | 3/1972 | Garnett ........................ 280/477 |
| 3,717,362 A | | 2/1973 | Johnson |
| 3,891,239 A | | 6/1975 | Leo et al. |
| 3,929,237 A | * | 12/1975 | Schaedler .................. 214/86 A |
| 4,078,827 A | * | 3/1978 | Pilhall .................... 280/491 B |
| 4,109,930 A | | 8/1978 | Pilhall |
| 4,283,072 A | * | 8/1981 | Deloach ...................... 280/422 |
| 4,570,966 A | | 2/1986 | Giboney et al. |
| 4,744,583 A | | 5/1988 | Blackwood |
| 4,807,899 A | * | 2/1989 | Belcher ....................... 280/477 |
| 5,401,047 A | * | 3/1995 | Dettling .................... 280/479.1 |

* cited by examiner

Primary Examiner—Paul N. Dickson
Assistant Examiner—C. T. Bartz
(74) Attorney, Agent, or Firm—Michael J. Striker

(57) ABSTRACT

A trailer coupling for motor vehicles has a bar, a ball provided on the bar, the bar being automatically adjustable between an idle position and an operating position, and an adjusting drive including an electric motor which automatically adjust the bar between the idle position and the operating position.

20 Claims, 5 Drawing Sheets

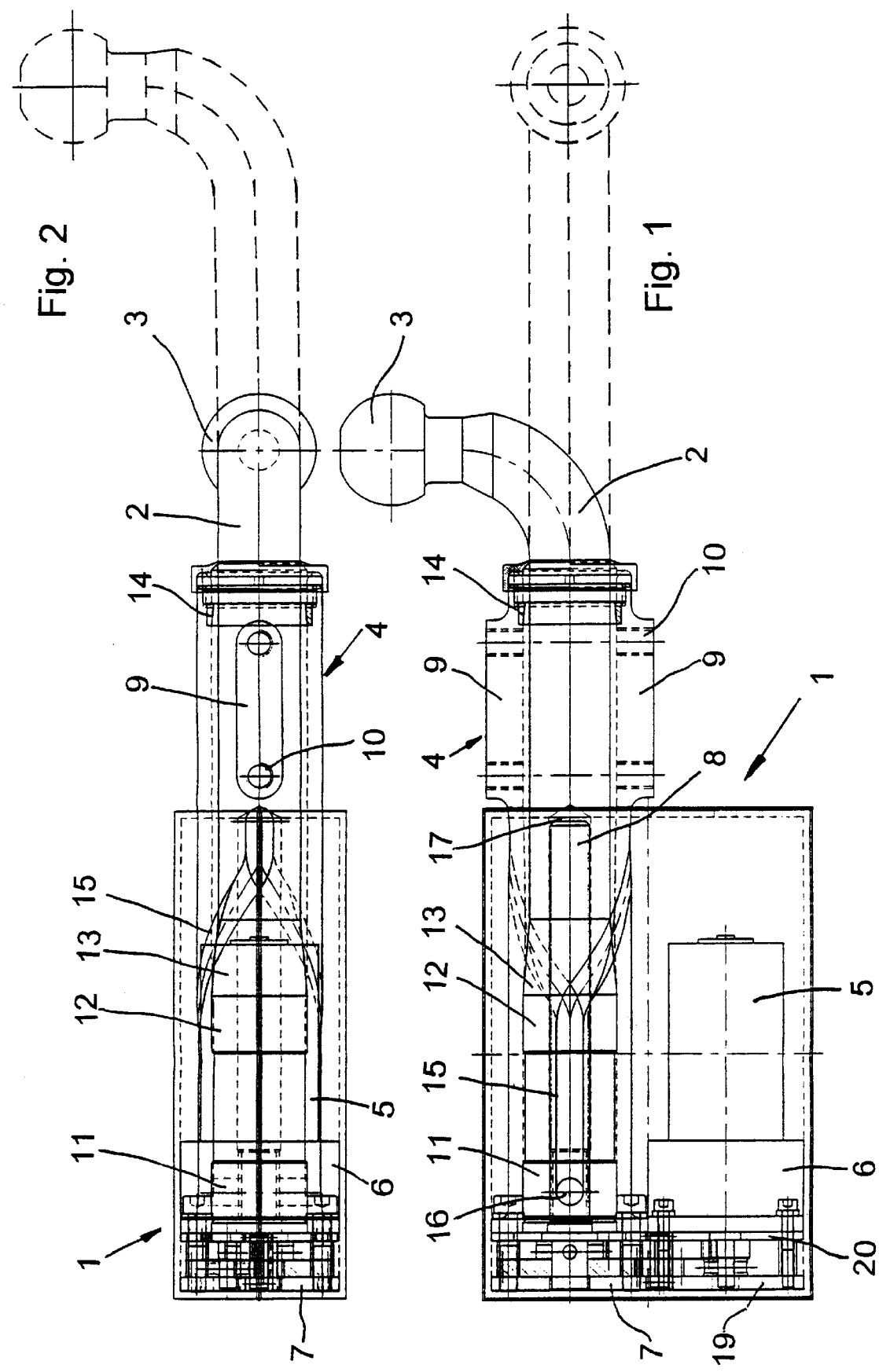

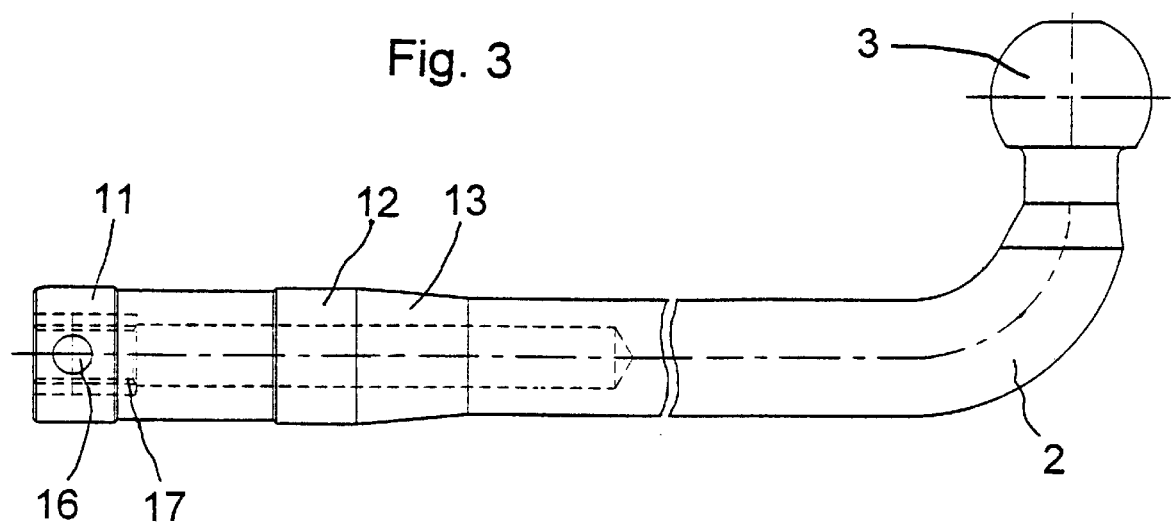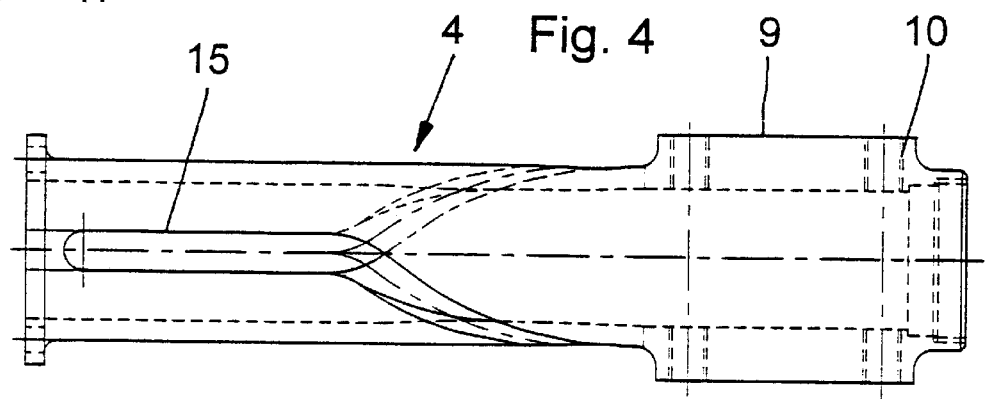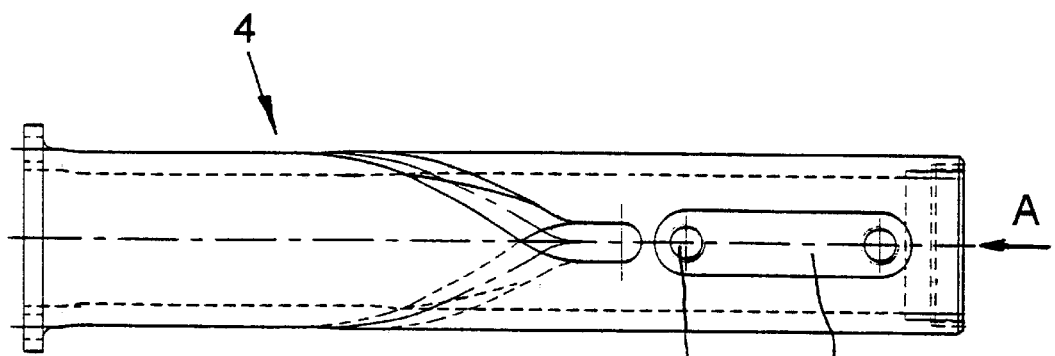

MOTOR VEHICLE TRAILER COUPLING

BACKGROUND OF THE INVENTION

The invention relates to a trailer coupling for motor vehicles with a bar on which a ball is located in the usual manner.

As long as trailer couplings are not used the ball-bar protruding beyond the rear bumber disturbs. For solving this problem trailer couplings are known whose ball-bar may be disassembled. It has been found that the disadvantage of the known trailer couplings is that the disassembly of the ball-bar is physically very demanding.

BRIEF SUMMARY OF THE INVENTION

It is the object of the invention to put forward a trailer coupling which does not have this disadvantage.

The object is solved by the features of patent claim 1.

Further advantageous formations of the invention are described in the dependent claims 2 to 8.

BRIEF DESCRIPTION OF THE DRAWINGS

The invention is described in more detail by way of a preferred embodiment form with reference to the drawings, wherein further advantageous details can be deduced from the drawings. The same parts with regard to their function are provided with the same reference numerals.

The drawings show individually:

FIG. 1 an elevation of the trailer coupling according to the invention, with an axial adjustment into the idle position, FIG. 2 a lateral view of the trailer coupling according to the invention and according to FIG. 1, FIG. 3 a lateral view of a ball-bar according to FIG. 1, FIG. 4 an elevation of a sleeve for receiving the ball-bar according to FIG. 3, FIG. 5 a lateral view of the sleeve according to FIG. 4, FIG. 6 a view according to arrow A in FIG. 5, FIG. 7 a lateral view of an alternative embodiment form with a pivotable ball-bar, FIG. 8 a section according to line B—B of FIG. 7, through the drive of the ball-bar, FIG. 9 a lateral view of a further embodiment form with a laterally pivotable coupling bar, and FIG. 10 a plan view of the embodiment form according to FIG. 9.

DETAILED DESCRIPTION OF THE INVENTION

Figure 6:
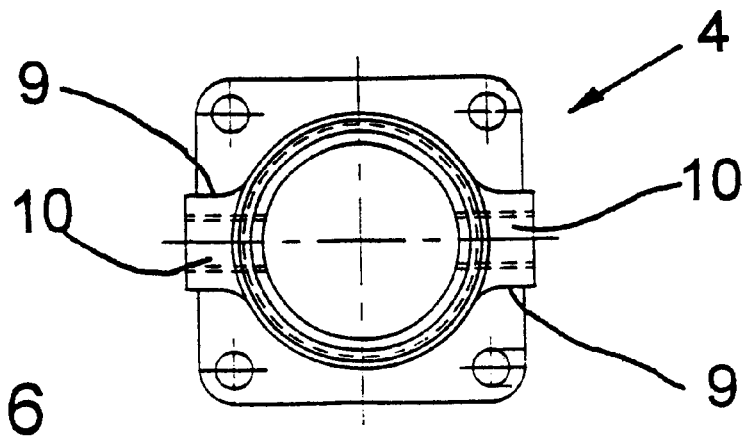

In FIG. 1 the adjustable trailer coupling is indicated at 1. It consists essentially of an axially adjustable bar 2 whose outer end carries a ball 3 as well as a guiding sleeve 4, a motor with planet gears 6, a spur gear 7 and an adjusting spindle 8.

The guiding sleeve 4 on both sides carries in each case an assembly flange 9 in which there are incorporated threaded bores 10. The whole trailer coupling 1 is assembled onto a vehicle in that by way of screws it is fastened onto a suitable bracket of the vehicle. With this screws engage into the threaded bores 10.

The bar 2 is accomodated by the guiding sleeve 4. For this purpose the bar 2 comprises a rear guiding surface 11 and a front guiding surface 12 which via a cone 13 blend into a somewhat slimmer bar 2.

Furthermore in the guiding sleeve 4 an annular inner cone 14 is fastened. Finally in the guiding sleeve 4 there are formed guiding slots 15.

On the bar 2 in the rear region there is fastened a pin-like connecting rod 16 which engages into the guiding slot 15. Furthermore in the bar 2 there is incorporated a pocket hole with an inner thread 17.

The adjusting spindle 8 is screwed into the mentioned inner thread 7 and is rotated by an electrical motor via the spur gear 7 as well as the planet gear 6. The individual gearwheels of the gear 7 are mounted between lateral plates 19 and 20. The housing of the planet gear 6 and the guiding sleeve 4 are rigidly connected to the plate 20. The adjusting spindle 8 is likewise rotatably mounted in the plates 19 and 20 so that it can be rotated by the electrical motor 5 as desired.

If the motor 5 is driven in the corresponding direction, then the adjusting spindle 8 also rotates. At the same time the bar 2 which is arranged as a nut on the adjusting spindle 8 and is secured against rotation by the connecting member 16 is pushed outwards. With this axial movement the bar 2 is guided in the guiding sleeve 4 by the guiding surfaces 11 and 12. The bar reaches its end position when the outer cone 13 sits rigidly in the annular inner cone 14.

As long as the guiding slots 15 run in the axial direction, the bar 2 maintains its radial position. After roughly half the adjusting distance the guiding slots 15 blend into a spiral-shaped course. This results in the fact that the bar 2 on extending then correspondingly turns so that the ball 3 in the operating position points vertically upwards. The operating position is shown in FIGS. 1 and 2 by dashed lines.

For a better understanding the essential parts are again individually shown in FIGS. 3 to 6.

Figure 7:
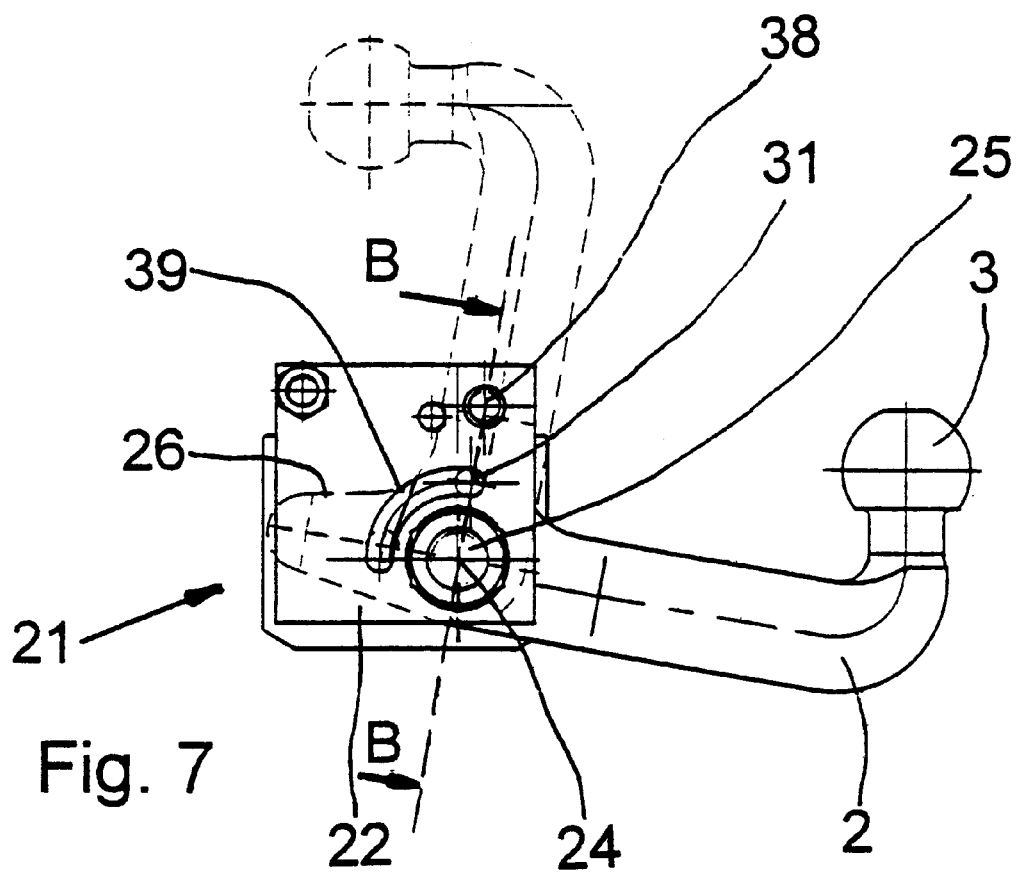

An alternative embodiment form of a trailer coupling is shown in FIG. 7. With this embodiment form the bar 2 is not axially displaced, but is pivoted about an axis 24.

For an easier understanding only the bar 2 with its pivoting drive 21 is shown, wherein known additional drive parts such as a gear motor, are not shown.

FIG. 7 shows a pivoting drive 21 with which the bar 2 can be pivoted upwardly about approximately 90°.

The drive however can in a slightly modified form serve for passing through other pivoting angles.

Figure 9:
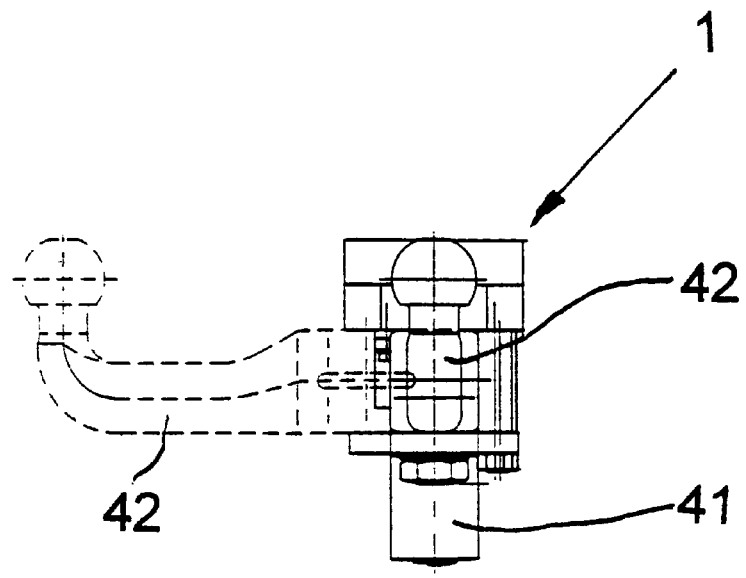
Figure 10:
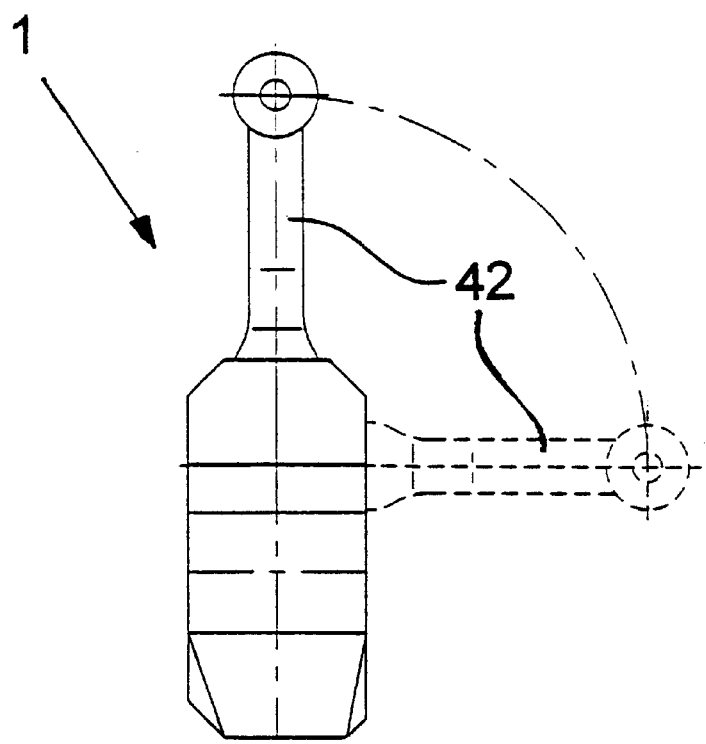

With a correspondingly modified installation location, and an adapted bar 42 for this, a modified pivoting drive 41 may also be applied for a horizontal pivoting of the bar 42. Such a pivoting drive 41 is shown in the FIGS. 9 and 10.

With the embodiment shown in FIG. 7 the bar 2 however is pivoted vertically upwards. For this purpose it is pivotably mounted between two plates 22 and 23 about the axis 24 on the pintail 25.

Figure 8:
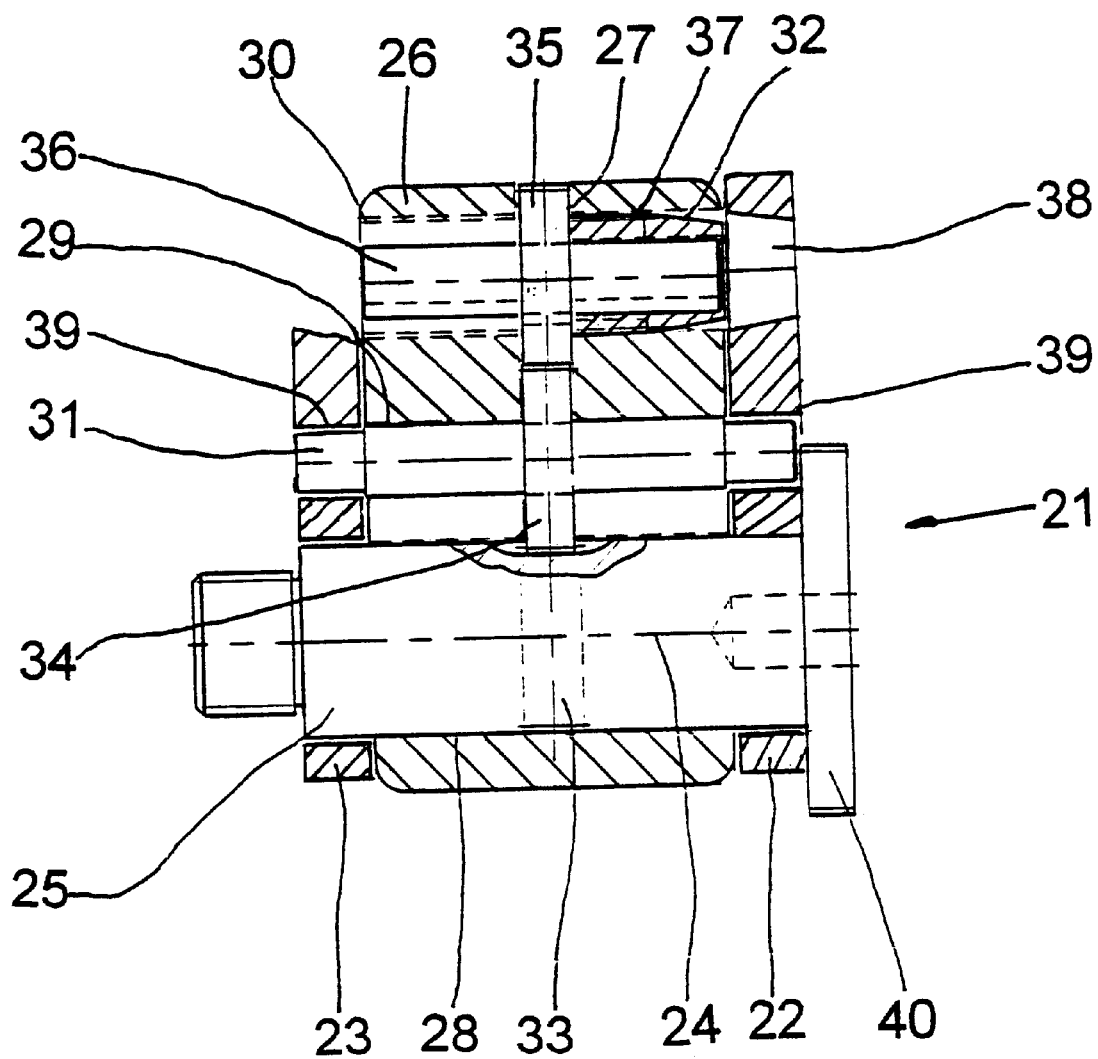

Furthermore the bar 2 comprises a limb 26 whose function can be seen from FIG. 8.

In FIG. 8 a section corresponding to the marking effected in FIG. 7 is shown. In the region of the limb 26 the bar 2 is thus provided with a slot 27. Furthermore perpendicular to the plane of the slot there is provided a bearing bore 28 for the pintail 25, a bearing bore 29 for a pinion shaft 31 as well as a bore with an inner thread 30 for a blocking cone 32.

As mentioned the pintail 25 is rotatably mounted between two plates 22 and 23. In the region of the slot 27 of the bar 2, the pintail 25 comprises a toothing 33. A gearwheel 34 engages into this toothing 33, the gearwheel being mounted on the pinion shaft 31. With the gearwheel 34 there meshes a further gearwheel 35 which is connected to a shaft 36 in a rotatably rigid manner.

On the shaft 36 on both sides of the gearwheel 35 there is each mounted a blocking cone 32 in a rotatably rigid but axially displaceable manner. This blocking cone 32 comprises an outer thread 37 which engages into the inner thread 30. For the blocking cone 32 a locking opening 38 is provided in the plates 22 and 23.

In the position shown in FIG. 8 the blocking cone 32 should be retracted in the usual manner into the locking opening 28. For a better recognition it is shown in a position in which the bar 2 may be pivoted.

The ends of the pinion shaft 31 are guided in arc-shaped slots 39 of the plates 22 and 23. The remaining bores of the plate 22 shown in FIG. 7 serve for its fastening onto the vehicle or serve the fastening of a further gear with a suitable electrical drive or the connection by way of distance bolts.

The position of the bar 2 represented in FIG. 7 with dashed lines corresponds to its operating position. For pivoting the bar 2 then, a gearwheel 40 rigidly connected to the pintail 25 is driven. Since firstly the blocking cone 32 is retracted into the locking opening 38 of the plate 23, the bar 2 can still not be pivoted about the axis 24. Instead of this via the toothing 33 and via the gearwheel 34 the gearwheel 35 is rotated. Since this gearwheel is rigidly connected to the shaft 36, the shaft 36 drives the blocking cone 32. Since the outer thread 37 of the blocking cone is engaged with the inner thread 30, at the same time the blocking cone 32 moves axially inwards until it is completely extended out of the locking opening 38. As soon as the blocking cone 32 comes to bear on the gearwheel 35, the gearwheel 35 and the gearwheel 34 which is engaged with it are blocked. By way of this the pintail 25 drives the blocked gearwheel 34 and the pinion shaft 31, so that the pinion shaft 31 is pivoted about the axis 24. At the same time the pinion shaft 31 which is mounted in the bearing bore 29 of the bar 2 then drives this bar so that the bar 2 is pivoted. This pivoting movement finishes as soon as the pinion shaft 31 reaches the end of the slot 39.

For the purpose of clarity it must be mentioned that in FIG. 8 the left blocking cone is not shown.

For the electrical drive it is provided for this to be switched off as soon as the laod exceeds a previously set limiting value. In this way damages are avoided, in the case that on moving the bar 2 foreign bodies should inhibit the further operation. So that the adjustment cannot be initiated during the journey of the vehicle it is furthermore provided for the trailer coupling to only be able to be operated outside the compartment of the vehicle. It is particularly advantageous when the operating means, for example a switch, is arranged in the boot of the vehicle.

In this manner there is created a vehicle coupling which is easily and comfortably brought into a position in which it no longer disturbs.

What is claimed is:

1. A trailer coupling for motor vehicles, comprising a towing bar formed so as to be axially displaceable between an in operative position and an operating position; a spindle and nut drive for displacing said towing bar between said positions, said towing bar being formed as a part of said spindle and nut drive; and a motor with which said towing bar is connected for displacement of said towing bar, said towing bar being formed so as to be rotatable about its axis.

2. A trailer coupling as defined in claim 1, wherein said towing bar has an axial bore with an internal thread serving as a nut of said spindle and nut drive.

3. A trailer coupling as defined in claim 2, wherein said spindle/nut has a spindle formed as a threaded rod which is located inside said axial bore of said towing bar.

4. A trailer coupling as defined in claim 3, wherein said spindle has a drive motor.

5. A trailer coupling as defined in claim 4, wherein said drive motor is an electric drive motor.

6. A trailer coupling as defined in claim 1, wherein said towing bar is formed so as to lock automatically in said operating position.

7. A trailer coupling as defined in claim 1, and further comprising a link guide for rotation of said towing bar.

8. A trailer coupling as defined in claim 1; and further comprising a coupling piece for an electrical supply of a trailer, said coupling piece being associated with said bar and also being displaceable.

9. A trailer coupling as defined in claim 8, wherein said coupling piece is power-displaceable.

10. A trailer coupling as defined in claim 1, wherein said bar has a drive which is operable via an effective connection and has a switch disposable outside of a passenger cell of a vehicle.

11. A trailer coupling as defined in claim 10, wherein said switch is disposable in a large compartment of the vehicle.

12. A trailer coupling for motor vehicles, comprising a bar which is swivelable between an inoperative position and a locked horizontal operating position; and at least one drive provided for swiveling locking and unlocking motions of said bar, said at least one drive being formed so that it positively locks and unlocks automatically upon swiveling into or out of said operating position, wherein the bar is swivelable from said operating position into said inoperative position upwardly or horizontally about 0° or 90°.

13. A trailer coupling as defined in claim 12, wherein said at least one drive is formed as an electric drive motor.

14. A trailer coupling as defined in claim 12; and further comprising a driving axle on which said bar is rotatably supported; and a pinion shaft which engages into said driving axle and drives said bar.

15. A trailer coupling as defined in claim 12; and further comprising a locking cone displaceably supported in said bar and formed so as to lock said bar automatically in said operating position.

16. A trailer coupling as defined in claim 5, wherein said bar has a pinion shaft; and a spindle and nut drive which displaces said locking cone and is formed so as to be drivable by said pinion shaft of said bar via a gear shaft.

17. A trailer coupling as defined in claim 12; and further comprising a coupling piece for an electrical supply of a trailer, said coupling piece being associated with said bar and also being displaceable.

18. A trailer coupling as defined in claim 17, wherein said coupling piece is power-displaceable.

19. A trailer coupling as defined in claim 12, wherein said bar has a drive which is operable via an effective connection and has a switch disposable outside of a passenger cell of a vehicle.

20. A trailer coupling as defined in claim 19, wherein said switch is disposable in a large compartment of the vehicle.

* * * * *